Patented Nov. 11, 1947

2,430,461

UNITED STATES PATENT OFFICE 2,430,461

ORGANOMETALLIC COMPOUNDS CONTAINING 1,3,5-TRIAZINE RINGS

Ernst A. H. Friedheim, New York, N. Y.

No Drawing. Application May 19, 1944,
Serial No. 536,425

10 Claims. (Cl. 260—242)

This invention relates to therapeutically active compounds containing a 1,3,5-triazine ring linked by a nitrogen-containing bridge to an aromatic organic radical containing antimony and to methods of preparing such compounds. It has particular relation to 1,3,5-triazine derivatives in which at least one carbon atom of the triazine ring is linked by a —NH— group to a phenyl-group carrying a trivalent antimony radical.

It has been found that these 1,3,5-triazine-amino-phenyl-antimony compounds combine a high tripanocidal as well as a high spirochetocidal activity with a relatively low toxicity.

The compounds according to the present invention correspond to the general formula

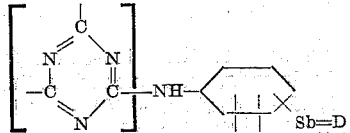

said formula representing new compounds consisting of a 1,3,5-triazine ring, at least one carbon atom of which is linked by a —NH— group to a phenyl-radical carrying a trivalent antimony-radical or to a substituted phenyl-radical carrying a trivalent antimony radical. D represents a divalent radical selected from the group consisting of O, S, dihalides, radicals of the formula

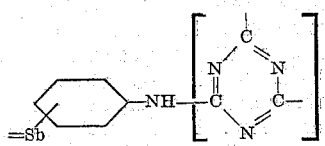

and sulfur-containing groups of the type =(SR)$_2$, wherein —SR is the residue of a sulfhydril compound of the type HS—R, and R is selected from the group consisting of aliphatic and cyclic radicals. Such sulfur-containing compounds are, for example, thioglycolic acid, cysteine, gluthathione, thiophenol, thioacetic acid, thiobenzoic acid, thioacetamide, thiosalicylic acid, p-sulfhydril-benzene sulfonic acid, thiopropionic acid, p-sulfhydril-phenylacetic acid.

Compounds according to the present invention correspond to the formula

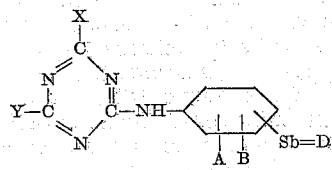

wherein X and Y may be equal or different and may represent halogens or residues of any inorganic or organic, aliphatic or cyclic, isocyclic or heterocyclic, monocyclic or polycylic molecule containing an active hydrogen atom capable of reacting with a cyanuric halide with the formation of hydrogen halide. For example, X and Y may be selected from the group consisting of Cl, Br, J, F, H, —OH, —O—alkyl, —O—acyl, —NH$_2$, —NH—alkyl, —N—alkyl$_2$, —NH—acyl, —NH—NH$_2$, —NH—NH—alkyl, —N—alkyl—NH$_2$, —N—alkyl—NH—alkyl, —NH—NH—acyl —N—acyl—NH$_2$, —N—acyl—NHacyl —NHaryl, —NH(CH$_2$)$_n$CONH$_2$ —NH—(CH$_2$)$_n$—NH$_2$, —NH(CH$_2$)$_n$NH—alkyl —NH(CH$_2$)$_n$—N—dialkyl, —NH(CH$_2$)$_n$OH —NH—CH$_2$CHOHCH$_2$OH, —NHOH, —NHCN —NH—C—NH$_2$,    —NH—C—NH—CN
    ||                  ||
    NH                  NH residues of cyanamide derivatives, residues of substituted guanidines, amino-derivatives of carbohydrates, particularly amino-derivatives of monosaccharides, such as glucose-amine, —SH, substituents of the type —S—R wherein R stands for any aliphatic or cyclic group capable of carrying a —SH group, such as thioglycolic acid and thiophenol, alkyl radicals and their substitution products, isocyclic and heterocyclic radicals, which may be monocyclic or polycyclic, and their substitution products, such as O-aryl groups, substituted aryl radicals, such as those corresponding to the formula

—NH—C$_6$H$_2$(A,B)—E,

—NH—NH—C$_6$H$_2$(A,B)—E wherein A and B may represent equal or different substituents defined further below, and E may represent a radical being in ortho-, meta- or para-position to the —NH— or —NH—NH— group, and selected from the group consisting of —SO$_3$H, —SO$_2$NH$_2$, —COOH. X and/or Y may also stand for radicals of the formula

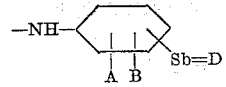

or for 1,3,5-triazine groups or residues of triazine derivatives. These radicals and said triazine groups or residues of triazine derivatives standing for X and/or Y may be linked directly or indirectly to the ring carbon atoms of the first or central triazine ring. In the latter case, the link between the substituting X, Y radical and the ring carbon atom of the first or central triazine ring may be formed by a cyclic or aliphatic amine radical, for example by an —NH—aryl, —NH—alkyl, —NH—NH—aryl or —NH—NH—alkyl radical. The link between the first or central triazine ring standing for X and/or Y may be formed by an —NH—, —NH—NH— group or an aliphatic or cyclic diamine, for example of the formula —NH—C₆H₄—NH— or —NH—CH₂—CH₂—NH—.

A and B may be the same or different, and are selected from the group consisting of hydrogen, halogen, —NO₂, —OH, —O—alkyl, -amino-, substituted amino-, and alkyl radicals. The antimony-containing group may be in ortho-, meta- or para-position with respect to the —NH— group.

The compounds embodying the present invention may be prepared by reacting a derivative of 1,3,5-triazine containing at least one active halogen with an aminophenyl compound carrying a radical of trivalent antimony. The compounds according to the invention may also be obtained by reacting a halogen-phenyl compound carrying a radical of trivalent antimony with a triazine derivative containing at least one amino-group with active hydrogen. Furthermore, compounds according to this invention may also be obtained by preparing a triazinyl-amino-phenyl-compound carrying in the aminophenyl-group a trivalent antimony radical and interchanging one or more active atoms linked to the triazine ring, or to the benzene ring or to the antimony radical with other suitable radicals. Compounds of the general formula

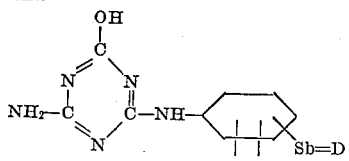

may be, for example, obtained by refluxing a compound corresponding to the formula

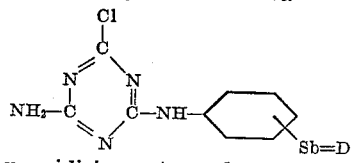

in a non-oxidizing atmosphere with aqueous alkali solution. Or a compound corresponding to the formula

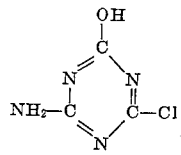

and prepared by treating cyanuric chloride at 10°–20° C. with aqueous alkali hydroxide, neutralizing the reaction mixture and heating it then with concentrated aqueous ammonia at about 50° C., may be condensed with a compound of the formula

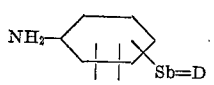

Furthermore, compounds of the type

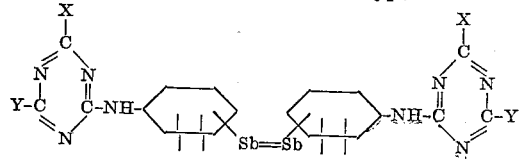

may be obtained by subjecting, for example, a compound corresponding to the formula

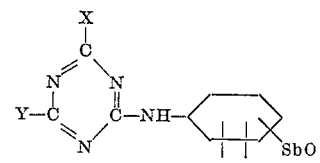

to the action of a suitable reducing agent, such as stannous chloride or hypophosphorous acid (H₂PO₃) in hydrochloric acid solution in the presence of HJ, or sodium hydrosulfite (Na₂S₂O₄) in alkaline solution.

*Example I.*—A solution of 16.5 parts by weight of [3-aminophenyl]-stibinous dichloride hydrochloride in 300 parts by weight of water is added dropwise to a fine suspension of 9.22 parts by weight of 2,4,6 trichloro-1,3,5-triazine (cyanuric chloride) in 400 parts by weight of water under cooling and vigorous stirring for about 1 hour. The reaction takes place according to the following scheme:

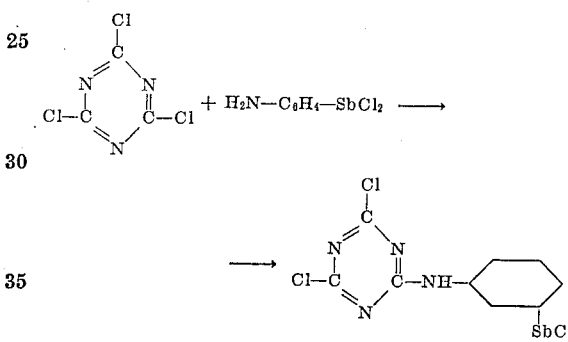

Upon the addition of dilute ice-cold aqueous ammonium hydroxide, the corresponding 2,4-dichloro - 1,3,5 - triazinyl - (6) - aminophenyl-antimony oxide of the formula

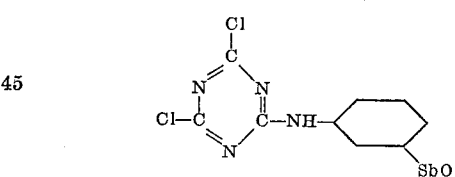

is formed and may be separated from the liquid as a white precipitate. This compound may be converted into the corresponding 2-chloro-4-amino-1,3,5-triazinyl compound by subjecting it to the further action of ammonia in a non-oxidizing atmosphere. For example, the above mentioned moist white precipitate is covered with 100 times the quantity of 10% ammonia and shaken at 45° C. for about 1 hour, the excess ammonia is removed under reduced pressure and finally the reaction mixture is acidified with acetic acid. The resulting 2-chloro-4-amino-1,3,5-triazinyl-(6)-aminophenyl-antimonyoxide is sparingly soluble in aqueous solutions of alkali hydroxides, and in excess dilute hydrochloric acid. By treating the above described 2,4-chloro-1,3,5-triazinyl-(6)-aminophenyl stibinous compounds with aqueous ammonia under pressure, both Cl-atoms of the triazine ring may be substituted by —NH₂ groups. Furthermore, one or both of these Cl-atoms may be interchanged with substituted amino-groups by treating the chloro-triazine derivatives for example with alkylamines, hydroxy-alkyl amines or dialkylamino-alkyl amines.

*Example II.*—7.3 parts by weight of chloro-cyanuric-diamide are refluxed with a solution of 11.5 parts by weight of [3-amino-phenyl]-stibinous oxide in 500 parts by weight of 1% aqueous hydrochloric acid in a non-oxidizing atmosphere until the reaction of primary amine has become negative in the solution. After this period of heating the solution is allowed to cool in an ice bath, and a current of HCl gas is passed to precipitate the reaction product formed. The precipitate consists substantially of a compound corresponding to the formula

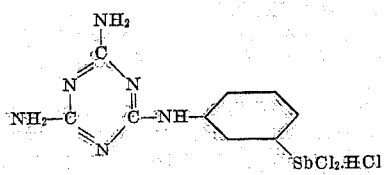

By the action of dilute, cold aqueous H₄N.OH, this compound may be converted into the corresponding antimony oxide compound.

*Example III.*—16.88 parts by weight of 3-amino-4-hydroxy-phenyldichlorostibine hydrochloride of the formula

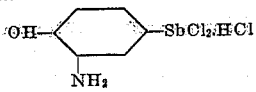

are dissolved in 1000 parts by weight of 1% aqueous hydrochloric acid and refluxed with 7.3 parts by weight of chloro-cyanuric-diamide in a non-oxidizing atmosphere until the reaction of primary amine in the solution has become negative. The solution is then cooled in an ice bath, and precipitated by a current of HCl gas passed through the solution. The precipitate thus obtained corresponds to the formula

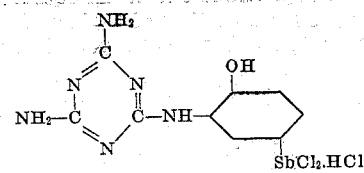

*Example IV.*—A solution of 16.5 parts by weight of 4-amino-phenyl dichlorostibine hydrochloride of the formula

in 900 parts by weight of 1% aqueous hydrochloric acid are refluxed with 7.3 parts by weight of chloro-cyanuric diamide in a non-oxidizing atmosphere until the reaction of primary amine in the solution has become negative. When this condition is obtained, the solution is cooled in an ice bath, and the cooled solution is precipitated by passing a stream of HCl gas through the same. The precipitate thus obtained consists of a compound corresponding to the formula

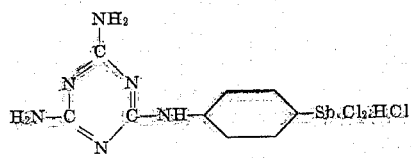

*Example V.*—A triazine derivative of the formula

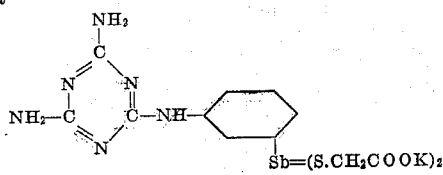

may be obtained by reacting the 2,4-amino-1,3,5-triazine-(6)-aminophenyl-dichlorostibine hydrochloride obtained in accordance with the above Example II, with potassium thioglycolate. In order to prepare said triazine derivative, 4.3 g. of the compound corresponding to the above formula are added to an aqueous solution of 2.6 g. of potassium thioglycolate. The mixture is moderately heated in a non-oxidizing atmosphere and is adjusted to a pH of about 8.0 with Na₂CO₃. From the solution thus obtained the free acid may be precipitated by acidifying, for example by the introduction of SO₂ gas.

By using an equivalent amount of sodium thiosalicylate, instead of the potassium thioglycolate in the above example, a compound corresponding to the formula

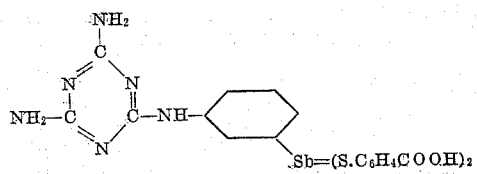

may be obtained in a substantially similar manner.

*Example VI.*—1.4 g. of p-aminophenyl stibinous chloride are suspended in 45 cc. of methylalcohol. The suspension is mixed with a solution of 1.0 g. of thioglycolic acid in methyl alcohol. The reaction mixture is heated on the steam bath for 1 hour, filtered and allowed to cool. On cooling, a reaction product formed according to the following scheme separates as a precipitate:

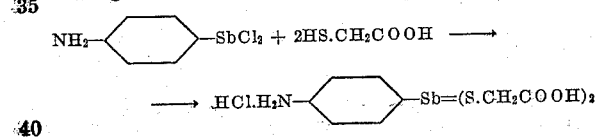

The precipitate thus formed is dissolved in the minimum amount of n/20 aqueous sodium hydroxide, and the solution is reacted with 1.5 g. of 2,4-diamino-6-chloro-1,3,5-triazine while passing a stream of nitrogen through the reaction mixture until the reaction of primary amine has become negative in the solution. The reaction mixture is then saturated with CO₂, charcoaled and filtered. The clear filtrate is precipitated by acidifying, preferably with SO₂ gas, the precipitate is filtered off, washed with aqueous SO₂ solution and alcohol, and dried under reduced pressure. The reaction product formed corresponds to the formula

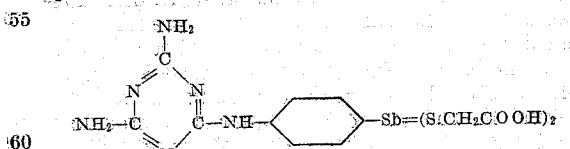

This compound is soluble in dilute aqueous sodium bicarbonate, sodium hydroxide, potassium hydroxide, diethylamine. It is insoluble in chloroform and ether. It is precipitated from its alkaline solution on acidifying with acetic or mineral acids, but is redissolved in excess dilute mineral acid. Dissolved in an excess of strong alkali it gives a purple color on addition of sodium nitroprussate. It decolorizes hot Fehling solution and dissolves without color in concentrated sulfuric acid. It has a high therapeutic index amounting up to 20–25 in experimental trypanosomiasis (*Trypanosoma equiperdum*) in the mouse. One single well tolerated dose of its water-soluble alkali salts causes in rabbits the spirochetes to disappear in syphilitic chancres within 24 hours.

*Example VII.*—2.8 g. of a condensation product corresponding to the formula

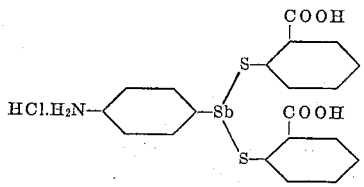

and obtained by reacting one mol of p-aminophenyl stibinous chloride with 2 mols of thiosalicylic acid are reacted with chlorocyanuric diamide substantially in the manner described in Example VI. The reaction product thus formed corresponds to the formula

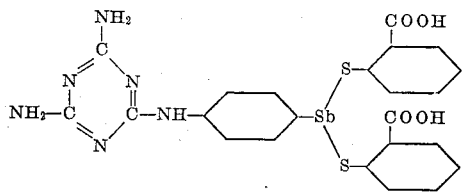

*Example VIII.*—1.9 g. of p-sulfhydril benzene sulfonic acid are dissolved in ethyl alcohol and the alcoholic solution is reacted under stirring with an alcoholic suspension of 1.7 g. of 2,4-amino-1,3,5-triazinyl-(6)-aminophenyl stibinous oxide. The reaction takes place according to the following scheme:

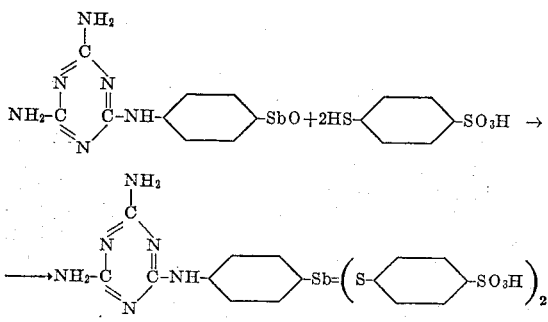

The product thus formed is soluble in dilute aqueous solutions of $NaHCO_3$ and $Na_2CO_3$.

Analogous products in which the trivalent Sb-atom carries —SR radicals consisting of the residues of thioglycolamide, thiopropionic acid, 8-mercapto-quinoline, 2-mercapto-pyridine, cysteine or gluthatione may also be prepared according to the above described methods.

*Example IX.*—3.5 g. of 4-chloro-3-aminophenyl stibinous chloride hydrochloride are dissolved in 200 g. of 1% aqueous hydrochloric acid and refluxed with 1.5 g. chlorocyanuric diamide in a non-oxidizing atmosphere until the reaction of primary amine has become negative in the solution. The solution is then cooled in an ice bath, and then precipitated by the introduction of HCl gas. The precipitate corresponds to the formula

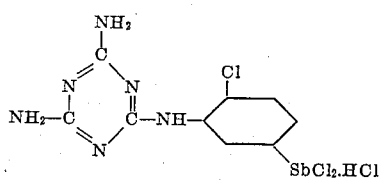

It will be understood that this invention may be carried out in other specific ways than those herein set forth, and the examples should be, therefore, considered as illustrative and not restrictive within the spirit of the invention as defined in the appended claims.

It is to be understood that the terms "amino" radical or group and "aminophenyl" radical or group are used in the present specification and claims to include unsubstituted as well as the above disclosed substituted amino radicals and aminophenyl radicals.

Reference is made to my co-pending application Serial No. 506,564, filed October 16, 1943.

I claim:

1. A new 1,3,5-triazine compound consisting of a 1,3,5-triazine ring, one ring carbon atom of which is linked to an aminophenyl group substituted in the benzene ring by a radical of the formula —Sb=D wherein D represents a radical selected from the group consisting of O, S and dihalides and the substituents of the other triazine ring carbon atoms are selected from the group consisting of amino, halogen and OH radicals.

2. A new 1,3,5-triazine compound of the formula

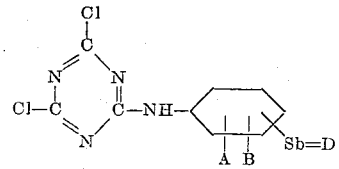

wherein A and B are selected from the group consisting of H, halogen, amino, and —OH radicals, and D represents a divalent radical selected from the group consisting of O, S, and dihalides.

3. A new 1,3,5-triazine compound of the formula

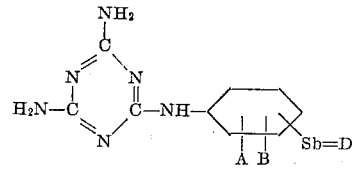

wherein A and B are selected from the group consisting of H, halogen, amino, and —OH radicals, and D represents a divalent radical selected from the group consisting of O, S, and dihalides.

4. A new 1,3,5-triazine compound of the formula

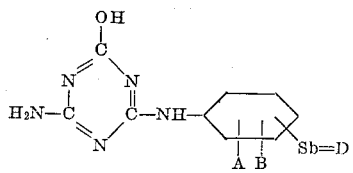

wherein A and B are selected from the group consisting of H, halogen, amino, and —OH radicals, and D represents a divalent radical selected from the group consisting of O, S, and dihalides.

5. A new 1,3,5-triazine compound of the formula

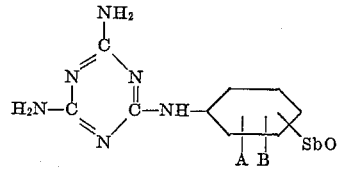

wherein A and B are selected from the group consisting of H, halogen, amino, and —OH radicals.

6. A new 1,3,5-triazine compound of the formula

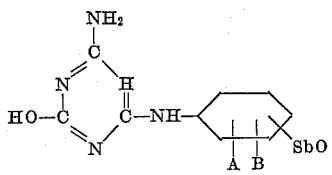

wherein A and B are selected from the group consisting of H, halogen, amino, and —OH radicals.

7. In a process for preparing a 1,3,5-triazine compound consisting of a 1,3,5-triazine ring one ring carbon atom of which is linked to an aminophenyl group substituted in the benzene ring by a radical of the formula —Sb=D wherein D represents a radical selected from the group consisting of O, S and dihalides, the step comprising reacting a 1,3,5-triazine derivative substituted at one carbon ring atom by a Z-substituent selected from the group consisting of halogen and amino radicals, while the other carbon ring atoms of the triazine derivative are substituted by a radical selected from the group consisting of amino, halogen and OH radicals, with a substituted phenyl-antimony compound of the formula

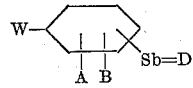

wherein A and B are selected from the group consisting of H, halogen, amino and —OH radicals, and one of Z and W is a halogen radical and the other is an amino radical.

8. In a process for the preparation of a 1,3,5-triazine derivative of the formula

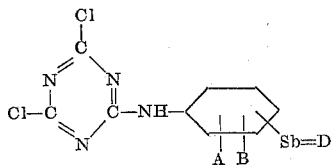

wherein D represents a radical selected from the group consisting of O, S and dihalides, and A and B are selected from the group consisting of H, halogen, amino and —OH radicals, the step comprising reacting cyanuric chloride with an aminophenyl-antimony compound of the formula

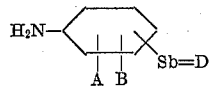

9. In a process for the preparation of a 1,3,5-triazine derivative of the formula

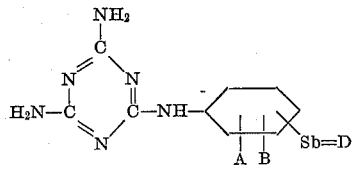

wherein D represents a radical selected from the group consisting of O, S and dihalides, and A and B are selected from the group consisting of H, halogen, amino and —OH radicals, the step comprising reacting chloro-cyanuric diamide with an amino-phenyl-antimony compound of the formula

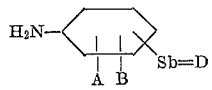

10. In a process for the preparation of a 1,3,5-triazine derivative of the formula

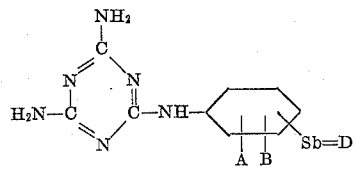

wherein D represents a radical selected from the group consisting of O, S and dihalides, and A and B are selected from the group consisting of H, halogen, amino and —OH radicals, the step comprising reacting cyanuric chloride with an aminophenyl-antimony compound of the formula

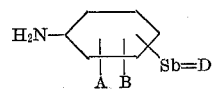

to form a dichloro-triazinyl-aminophenyl-antimony compound and subjecting the latter to the action of ammonia.

ERNST A. H. FRIEDHEIM.